United States Patent [19]

Bjordahl

[11] 4,275,427
[45] Jun. 23, 1981

[54] TRANSDUCER POSITIONING APPARATUS

[75] Inventor: James Bjordahl, Arcadia, Calif.

[73] Assignee: BASF Aktiengesellschaft, Rheinland-Pfalz, Fed. Rep. of Germany

[21] Appl. No.: 871,238

[22] Filed: Jan. 23, 1978

[51] Int. Cl.³ .................... G11B 5/55; G11B 21/10; G11B 21/12
[52] U.S. Cl. .................................. 360/106; 360/109
[58] Field of Search ............... 360/106, 105, 109, 130, 360/75, 78

[56] References Cited

U.S. PATENT DOCUMENTS

| 3,531,126 | 9/1970 | Tsukagoshi et al. | 360/106 |
| 3,592,068 | 7/1971 | Yamada | 360/106 |
| 3,715,523 | 2/1975 | Rousseau et al. | 360/106 |
| 3,839,735 | 10/1974 | Denk | 360/106 |
| 3,839,737 | 10/1974 | Vogel | 360/106 |
| 4,028,735 | 6/1977 | Miyazaki | 360/106 |

FOREIGN PATENT DOCUMENTS 787490 10/1935 France .
15867/71 7/1968 Japan ........................... 360/106

Primary Examiner—Alfred H. Eddleman

Attorney, Agent, or Firm—Fulwider, Patton, Rieber, Lee & Utecht

[57] ABSTRACT

Apparatus for accurately positioning a transducer head relative to parallel tracks on a recording medium such as magnetic tape. The apparatus includes a frame having a guide to direct the tape along a horizontal path past the transducer head, and a cam mounted for rotation on the frame. The cam has a cylindrically shaped upstanding portion in which a series of graduated planar steps is formed, each such step corresponding to a separate track on the tape. The apparatus further includes a lever having one end pivotally mounted to the frame and a remote end positioned to bear on one of the steps of the cam, and a platform assembly which carries the transducer head and which bears on a mid-portion of the lever. Rotation of the cam raises or lowers the remote end of the lever by a controllable number of steps, and thereby raises or lowers the transducer head by a corresponding but lesser amount, to align it with a selected track on the tape. Fine adjustment of the alignment of the transducer head with respect to the center of a track on the tape is accomplished by a mechanism for movement of the relative location of the pivoted end of the lever.

16 Claims, 5 Drawing Figures

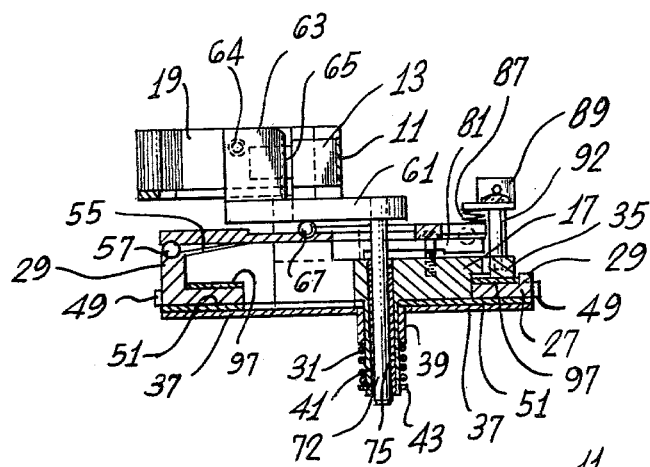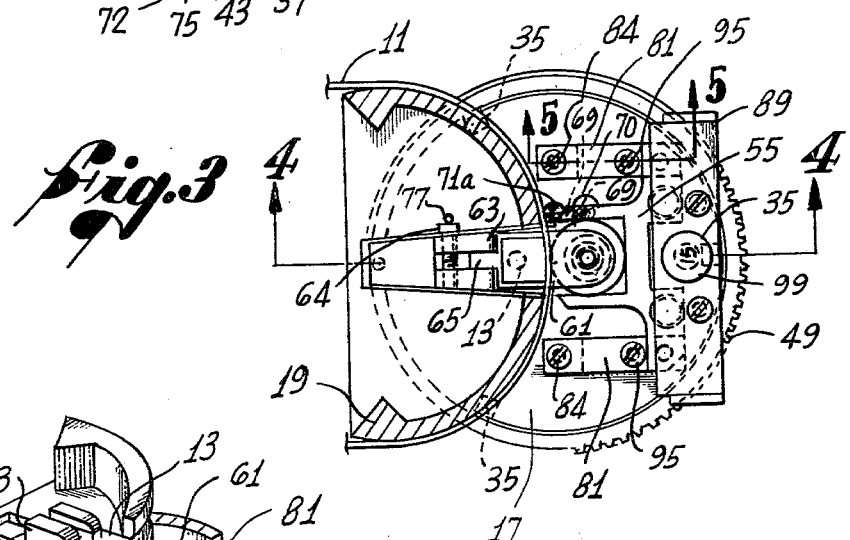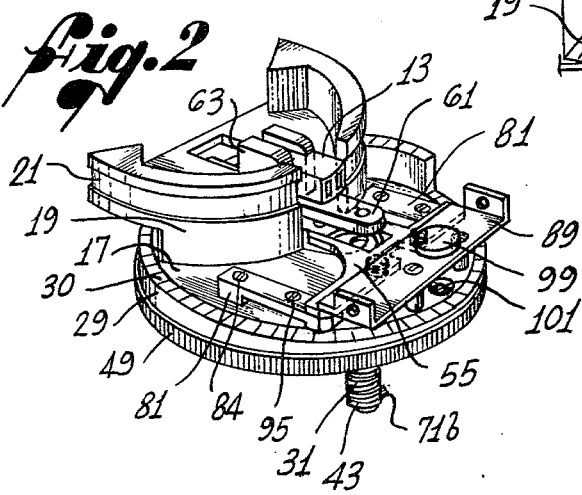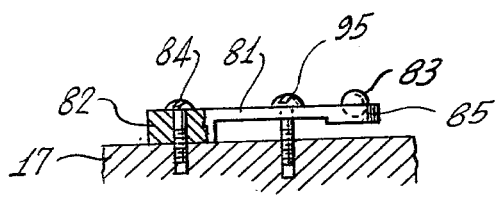

TRANSDUCER POSITIONING APPARATUS

BACKGROUND OF THE INVENTION

This invention relates generally to transducer positioning apparatus and, more particularly, to improvements in apparatus for positioning a transducer head in relation to tracks on a recording medium such as magnetic tape.

An example of transducer positioning apparatus of this general type is disclosed in a copending application for U.S. patent, Ser. No. 853,397, filed in the name of D. L. Burdorf et al and entitled "Transducer Positioning Device", now U.S. Pat. No. 4,144,549. As described in that application, such apparatus includes a frame having a guide to direct the tape past the transducer head, and a cam mounted for rotation on the frame and having a series of graduated planar steps formed in its upper surface. The transducer head is carried by a platform assembly having a bearing post which is maintained in continuous contact with the steps of the cam, whereby controlled rotation of the cam causes the head to move upwardly or downwardly to predetermined positions corresponding to the positions of recording tracks on the magnetic tape.

The aforedescribed prior art device suffers from the drawback that the precision with which the transducer head can be positioned relative to the tracks on the tape cannot exceed the precision with which the steps of the cam are formed. To be operable in a system having a relatively high track density, such as, for example, one in which the spacing between adjacent tracks is 0.006 inches or less, the cam must be formed with extreme accuracy and precision. Consequently, the manufacturing costs associated with such apparatus are relatively high.

Another drawback to the aforedescribed prior art device arises because of the inclusion of a complex and relatively expensive mechanism for the manual adjustment of the vertical position of the transducer head with respect to the centers of the tracks on the tape. The adjustment mechanism includes means for lifting the entire cam relative to the frame, to effect a relative movement of the head. Although this adjustment mechanism has provided satisfactory performance in some situations, a simpler and less expensive alternative would be preferred, if it could provide equally satisfactory results.

It will be appreciated from the foregoing that there is still a need for apparatus which can accurately position a transducer head relative to tracks on a magnetic tape, without involving undue complexity or cost. The present invention fulfills this need.

SUMMARY OF THE INVENTION

This invention resides in improved transducer positioning apparatus of the type having a frame, a cam movable on the frame, and a cam follower to bear on the cam, for controllably positioning a transducer head relative to tracks on a recording medium. In accordance with the invention, the apparatus includes means for coupling the transducer head to the cam follower in such fashion that movement of the cam follower effects corresponding movement, of a lesser magnitude, of the transducer head.

More specifically, a transducer positioning apparatus constructed in accordance with the present invention is especially adaptable for use in a video tape recorder of the longitudinal type, wherein the information tracks on the video tape are arranged in a parallel relationship across the width of the tape. The apparatus includes a frame which is integral with the chassis of the recorder and which includes means for guiding the magnetic tape of the recorder along a horizontal path past the transducer head. It will be understood that references made herein to directional orientations of the elements of the apparatus are solely for the purpose of describing the relative positions of such elements. The invention is not, of course, limited to a particular orientation.

The cam, which is mounted on the frame for rotation about a vertical axis, includes an upstanding portion having an upper cam surface formed with a series of graduated planar steps, each step corresponding to a particular track on the tape. The cam follower of the apparatus comprises a lever having a pivot end that is pivotally mounted to the frame and a remote end that bears on one step of the cam surface. Thus, rotation of the cam changes the step on which the remote end of the lever bears, to pivot the lever up or down accordingly.

The transducer head is carried by a head platform assembly that is coupled to a mid-portion of the lever. More particularly, the head platform assembly includes a horizontally oriented planar platform that is urged to bear on a ball bearing fixed to the upper surface of the mid-portion of the lever, and an upstanding member adapted to grip the transducer head. In operation of the apparatus, vertical movement of the remote end of the lever, due to rotation of the cam, causes the transducer head to experience a corresponding vertical movement, but of lower magnitude than that of the remote end of the lever.

The apparatus of the invention also includes azimuth alignment means carried by the platform assembly and the frame, for maintaining a horizontal orientation of the platform and thereby maintaining a precise angle, i.e., azimuth, of the transducer head relative to the tracks on the tape. The alignment means includes an elongated post projecting perpendicularly from the platform and means defining a corresponding vertically oriented bore located in the frame. The post is engaged in the bore and is slidable therein to maintain the platform horizontal as the platform assembly is raised and lowered by the cam and lever.

In accordance with another aspect of the present invention, the transducer positioning apparatus includes fine adjustment means by which the location of the pivot axis of the lever can be controllably adjusted, to permit alignment of the transducer head relative to the centers of the tracks on the tape. In particular, the adjustment means includes a pair of mounting blocks, each having a fixed end secured to the frame, and a free end in spaced relationship to the frame. The pivot end of the lever is supported on a pair of ball bearings, which engage corresponding seats located in the free ends of the mounting blocks. The adjustment means further includes means for controllably flexing the free ends of the mounting blocks relative to the frame, to correspondingly raise or lower the pivot end of lever and, to a lesser degree, the transducer head.

Many other aspects and advantages of the present invention will become apparent from the following description of the preferred embodiment, taken in conjunction with the accompanying drawings, which disclose, by way of example the principles of the invention.

BRIEF DESCRIPTION OF THE DRAWINGS

In the accompanying drawings:

FIG. 2 is a fragmentary perspective view of the apparatus of FIG. 1, showing the various parts of the apparatus in their assembled relationship;

FIG. 3 is a top plan view of the apparatus of FIG. 2, with a recording tape being shown in operative relationship with the transducer head;

FIG. 4 is a sectional view of the apparatus, taken substantially along the line 4—4 in FIG. 3; and FIG. 5 is an enlarged fragmentary sectional view, taken substantially along the line 5—5 in FIG. 3.

DESCRIPTION OF THE PREFERRED EMBODIMENT

Figure 1:
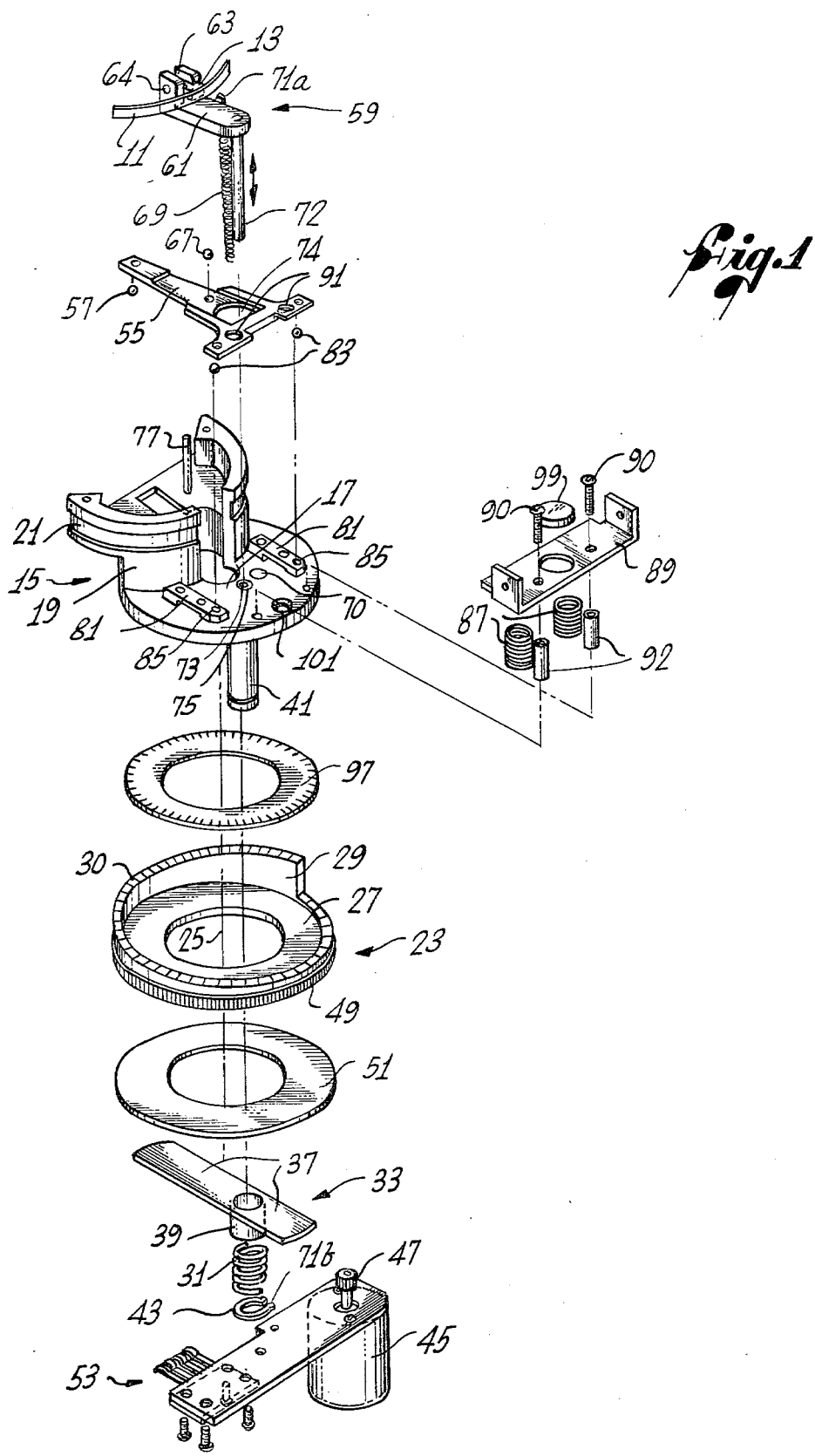
FIG. 1 is an exploded perspective view of a transducer positioning apparatus embodying the present invention.

Referring now to the drawings, and particularly to FIGS. 1 and 2, there is shown a transducer positioning apparatus constructed in accordance with the preferred embodiment of the present invention. The apparatus is used with a longitudinal video tape recorder in which a magnetic tape 11 having a plurality of parallel recording tracks is driven past a magnetic transducer head 13.

The apparatus includes a base block or frame 15 that is fixed in relation to the chassis of the recorder. The frame 15 includes a horizontal portion 17 and an upstanding portion 19, which has a guide 21 in the form of a shallow trough for directing the tape 11 along a horizontal path past the transducer head 13. One mechanism for effectively guiding the tape past the transducer is disclosed in U.S. Pat. No. 3,979,037, issued in the name of D. L. Burdorf and entitled "Air Guide for Tape Transports." It will be understood that references made herein to directional orientations of elements of the preferred embodiment of the present invention are solely for purposes of explanation, and are not to be construed as limitations of the invention.

The apparatus further includes a cam 23 that is mounted on the frame 15 for rotation about a vertical axis 25. The cam includes an annular horizontal portion 27 and a surrounding cylindrical upstanding portion 29 having an upper surface 30 in which a series of staircase-like planar steps is formed. Each such step corresponds to a particular longitudinal track on the magnetic tape 11. The interior wall of the upstanding portion bears on the periphery of the horizontal portion 17 of the base 15.

The annular portion 27 of the cam 23 is urged by a compression spring 31 and a T-bracket 33 to bear against a group of low-friction pads 35, shown in FIGS. 3 and 4, formed on the underside of the horizontal portion 17 of the frame 15. The T-bracket 33 includes a collar portion 39 that encircles a post 41 depending from the frame 15, and a pair of arms 37 that project laterally in opposite directions from the upper end of the collar, to abut opposite halves of the cam. The spring 31 also encircles the post 41 at a position between a snap ring 43 located at the lower end of the post, and the lower end of the collar 39, thereby urging the arms 37 into abutment with the cam 23. The post 41 is preferably located near the axis of rotation 25 of the cam 23, so that the arms 37 are of approximately equal length, and so that no substantial torques about an axis perpendicular to that of the collar 39, are applied to the T-bracket.

The cam 23 is rotated with respect to the frame 15 by a motor 45 having a pinion gear 47 that engages a set of gear teeth 49 formed on the periphery of the cam. The motor is selectively energized by control means responsive to control signals received from the recorder, to rotate the cam by a predetermined amount in either direction. The control means includes a printed circuit commutator disk 51 secured to the underside of the cam, and a set of contact brushes 53 for contacting the commutator disk to monitor the angular location of the cam. The control means is described in detail in the aforementioned application for U.S. patent, Ser. No. 853,397.

The apparatus further includes a lever 55 having a pivot end that is pivotally mounted to the horizontal portion 17 of the frame 15 and a remote end that is urged to bear on the staircase-like upper surface 30 of the cam 23. A cam ball bearing 57 is fixed to the underside of the remote end of the lever 55, to reduce frictional resistance to relative movement between the lever and the cam 23. Controlled rotation of the cam by an incremental number of steps will raise or lower the remote end of the lever 55 a corresponding number of steps.

In accordance with the invention, the transducer head 13 is coupled to a mid-portion of the lever 55, whereby a raising or lowering of the remote end of the lever upon rotation of the cam 23, will effect a corresponding raising or lowering, of lesser magnitude, of the transducer head. Rotation of the cam by a predetermined number of steps will translate the transducer head across an equal number of tracks on the tape 11. It will be appreciated, then, that the mechanical advantage created by the lever enables movement of the head from one tape track to another to be effected by cam steps of a proportionately greater magnitude. This increases manufacturing tolerances and thereby decreases manufacturing costs.

More specifically, the transducer head 13 is coupled to the lever 55 by a head platform assembly 59, which includes a planar platform 61 and an upstanding member 63. As best shown in FIGS. 3 and 4, the upstanding member 63 is located at one end of the platform 61 and is adapted to hold the transducer head 13. The member 63 includes two similar halves which are spaced apart from each other but which may be urged together upon the tightening of a screw 64. A finger-like base 65 projects in a rearward direction from the transducer head 13, and is gripped between the halves of the upstanding member 63 to secure the transducer head to the platform assembly 59. The assembly 59 is supported above the lever 55 on a platform support taking the form of a ball bearing 67, which is fixed to the upper surface of the mid-portion of the lever and which bears against the underside of the planar platform 61.

A head spring 69 yieldably urges the platform 61 to bear on the ball bearing 67, and likewise, urges the remote end of the lever 55 to bear on the upper surface 30 of the cam 23. The spring extends through an opening 70 formed in the frame 15 and interconnects a first tab 71a projecting laterally from the platform 61 with a second tab 71b projecting laterally from the snap ring 43 which encircles the frame post 41.

In accordance with another aspect of the invention, the apparatus includes means for automatically maintaining an accurate alignment of the azimuth of the transducer head 13 relative to the tracks on the tape 11. Alignment of the head azimuth can be limited to a maximum deviation of three minutes of arc, thus obviating the need for a manual azimuth adjustment. The alignment means includes an elongated alignment shaft 72 depending from the head platform assembly 59, and a corresponding vertically oriented bore 73 formed in the post 41 of the frame 15. As best shown in FIGS. 1 and 4, the shaft 72 projects downwardly from one end of the platform 61, in a perpendicular relationship to it, and passes through an opening 74 in the lever 55 to engage the bore 73. Preferably, a low-friction bushing 75 is placed within the bore 73, to provide a clearance tolerance of less than 0.001 inches and to minimize resistance to upward and downward sliding movement of the shaft in the bore.

It will be appreciated that the angular orientation of the lever 55 relative to the frame 15 varies as it is pivoted upwardly and downwardly by the cam 23. This variation, however, will not affect the angular orientation of the head platform assembly 59 which moves upwardly and downwardly along with it, because movement of the alignment shaft 72 carried by the assembly is restricted to upward and downward motion in the vertical bore 73. Thus, the pivoting movement of the lever 55 operates to raise and lower the platform assembly 59 while the alignment shaft 72 and bore 73 insure that the platform 61 is maintained in a horizontal orientation.

The head platform assembly 59 is prevented from pivoting in a horizontal plane, about the axis of the alignment shaft 72, by the head spring 69 acting in cooperation with a pin 77 that projects upwardly from the frame 15. The spring 69, which interconnects the head platform assembly 59 with the snap ring 43 on the frame post 41, yieldably urges the head of the screw 64, located in the upstanding member 63 of the assembly, into abutment with the pin 77. The spring 69 is angled slightly with respect to the axis of the alignment shaft 72, and a small rotational force about that axis is therefore applied to the assembly. Consequently, the pin 77 exerts a correspondingly small counter-rotational force against the assembly and accounts for very little frictional resistance to vertical movement of the assembly.

In accordance with a further aspect of the present invention, the means for pivotally mounting the pivot end of the lever 55 to the frame 15 includes fine adjustment means for permitting initial adjustment of the vertical position of the transducer head 13, to align it with the center of a track on the tape 11. As shown in FIGS. 2 and 5, the mounting means includes a pair of flexible mounting blocks 81 fixed to the frame 15, and a pair of pivot ball bearings 83 fixed to the underside of the pivot end of the lever 55. Each mounting block 81 has a fixed end that includes a downwardly projecting base pad 82 secured to the horizontal portion 17 of the frame 15 by a screw 84, and a free end that is cantilevered above the frame.

The free ends of the mounting blocks 81 are each formed on their upper sides with a concave seat 85, and the bearings 83 are urged to rest in the seats by a pair of coil springs 87 interposed between the upper side of the pivot end of the lever 55 and the underside of a bracket 89 fixed in a spaced relationship to the frame 15. Preferably, the bracket is in the form of a flat plate that is positioned over the pivot end of the lever 55 and fixed to the frame by a pair of screws 90 disposed through holes in the plate and through a pair of spacers 92 between the plate and the frame. Dimples 91 formed in the upper side of the lever receive the lower ends of the springs 87 to prevent them from sliding laterally out of their proper position.

The relative vertical location of the free end of each mounting block 81, and thus the relative location of the pivot end of the lever 55, can be manually adjusted by means of an adjustment screw 95 that couples the free end of the block to the frame 15. By manually tightening or loosening the adjustment screw, a controlled flexing of the mounting block is achieved, and the distance between the frame and the free end of the block can be controllably adjusted to raise or lower the pivot end of the lever 55 and, by this means, to raise or lower the transducer head 13 by a corresponding but lesser amount. It will be appreciated that the mechanical advantage provided by the lever 55 permits the transducer head to be positioned with a precision exceeding that with which the pivot end of the lever is adjusted. Each of the flexed mounting blocks exerts a sufficient vertical resistance force against the head of its corresponding adjustment screw 95, to prevent shock or vibration from loosening the screw and thereby causing a misalignment of the head 13.

The transducer positioning apparatus of the invention further includes means for providing a visible display of the particular cam step, and thus the particular tape track, on which the apparatus is currently operating. The means includes a track indicator decal 97 fixed to the upper side of the annular portion 27 of the cam 23, and a lens 99 fixed to the bracket 89.

The decal 97 is marked with a separate numeral corresponding to each cam step, and the numeral for the particular cam step on which the lever 55 is bearing is visible through an aperture 101 formed in the frame 15. The lens 99 magnifies the size of the numeral so that it can be read more easily by an operator of the video tape recorder.

From the foregoing description, it should be apparent that the present invention provides an effective mechanism for accurately positioning a transducer head relative to information tracks on a recording medium. The head is supported on a lever in such a fashion that a pivotal movement of the lever, in response to movement of a cam, effects positioning of the head relative to the tracks with a precision exceeding the precision with which the cam is formed. Further, the mechanism includes accurate azimuth alignment means to obviate the need for a special adjustment of the head azimuth, and track adjustment means to facilitate a simple, yet effective, initial alignment of the head with respect to the center of a track, by controlling the relative location of the pivot axis of the lever.

While a particular form of the invention has been illustrated and described, it will be understood by one of ordinary skill in the art that various modifications can be made without departing from the spirit and scope of the invention. Accordingly, it is not intended that the invention be limited, other than by the appended claims.

I claim:

1. Apparatus for positioning a transducer head relative to a series of parallel tracks on a recording medium, said apparatus comprising:
    a frame having means for guiding the recording medium along a predetermined path;
    a cam mounted for movement on said frame, said cam having a plurality of planar steps formed therein, each of said steps corresponding to a separate track on the recording medium;

a lever having a pivot end, a mid-portion and a remote end;

means for mounting the pivot end of said lever to said frame for pivotal movement with respect thereto, with the remote end of said lever bearing on the steps of said cam; and means coupled to the mid-portion of said lever for supporting said transducer head, said supporting means including a platform to carry said transducer head, means for urging said platform to engage the mid-portion of said lever, and alignment means for maintaining a fixed angular orientation of said platform relative to said frame, whereby pivotal movement of said lever relative to said frame effects a corresponding translational movement of said platform;

wherein movement of said cam effects a stepping movement of the remote end of said lever and, likewise, a stepping movement, of lesser magnitude, of said transducer head, to move the head along the surface of the recording medium and thereby position the head relative to the tracks on the recording medium with a precision greater than that with which the planar steps of said cam are formed.

2. Apparatus for positioning a transducer head as defined in claim 1, wherein said urging means is also effective to urge the remote end of said lever to bear on the steps of said cam.

3. Apparatus for positioning a transducer head as defined in claim 2, wherein said urging means includes a spring interconnecting said platform with said frame.

4. Apparatus for positioning a transducer head as defined in claim 1, wherein said alignment means is carried by said platform and said frame and includes an alignment shaft, and means defining a bore to receive said alignment shaft.

5. Apparatus for positioning a transducer head as defined in claim 2, wherein said urging means is also effective to urge the remote end of said lever to bear on the steps of said cam and to urge said platform to abut a portion of said frame, thereby preventing angular movement of said platform about the longitudinal axis of said alignment shaft and said bore.

6. Apparatus for positioning a transducer head as defined in claim 5, wherein said urging means includes a spring interconnecting said platform with said frame.

7. Apparatus for positioning a transducer head as defined in claim 1, wherein said platform includes a planar member to engage the mid-portion of said lever, and an upstanding member having opposite halves arranged in spaced relationship with each other, and means for urging together the opposite halves of said upstanding member, to thereby grip said transducer head.

8. Apparatus for positioning a transducer head as defined in claim 1, further including indicator means associated with said cam for providing a visible display of a reference mark corresponding to the particular step of said cam on which the remote end of said lever is then bearing.

9. Apparatus for positioning a transducer head in relation to the centers of a plurality of parallel tracks on a recording medium, said apparatus comprising:

a frame having a means for guiding the recording medium along a predetermined path;

a cam mounted for movement on said frame;

a lever having a pivot end and a remote end;

means for pivotally mounting the pivot end of said lever to said frame, with the remote end of the lever bearing on the cam; and means coupled to a mid-portion of said lever for supporting said transducer head, wherein movement of said cam relative to said frame effects movement of the remote end of said lever and, likewise, movement, of corresponding but lesser magnitude, of said transducer head, to move the head along the surface of the recording medium and thereby position the head relative to a selected track on the recording medium with a precision greater than that with which said cam is formed, said mounting means including a mounting block fixed to the frame, and means for controllably flexing a portion of said mounting block with respect to said frame to thereby position said transducer head relative to the centers of the tracks on the recording medium.

10. Apparatus for positioning a transducer head as defined in claim 9, wherein said mounting block has a fixed end that is fixed to said frame and a free end that is in spaced relationship to said frame and that supports the pivot end of said lever.

11. Apparatus for positioning a transducer head as defined in claim 10, wherein said flexing means includes a screw for coupling the free end of said mounting block to said frame, whereby the spacing between the free end of said mounting block and said frame can be controllably adjusted.

12. Apparatus for positioning and adjusting a transducer head in vertical relationship to a series of parallel tracks on a magnetic tape, said apparatus comprising:

a frame having means for guiding the magnetic tape along a predetermined path;

a cam mounted for rotation on said frame, said cam having an upstanding cylindrical portion with a plurality of graduated planar steps formed therein, each of said steps corresponding to a separate track on the magnetic tape;

a lever having a pivot end, a mid-portion and a remote end;

means for mounting the pivot end of said lever to said frame, for pivotal movement of said lever with respect to said frame, said lever being mounted with its remote end bearing on the steps of said cam;

a platform assembly coupled to the mid-portion of said lever, said assembly including a planar platform, an upstanding member having opposite halves arranged in spaced relationship with other and urged together to grip said transducer head;

alignment means carried by said platform assembly and said frame, for maintaining said planar platform in a horizontal orientation, said alignment means including an alignment shaft perpendicular to said planar platform, and means defining a correspondingly aligned bore to receive said alignment shaft, said alignment shaft and said bore being slidably movable relative to each other; and spring means interconnecting said platform assembly with said frame, for simultaneously urging said platform to bear on the mid-portion of said lever, and urging the remote end of said lever to bear on the steps of said cam, whereby stepping movement of said cam effects a corresponding movement, of lesser magnitude, of said transducer head to position said transducer head relative to a particular track on the magnetic tape.

13. Apparatus for positioning and adjusting a transducer head as defined in claim 12, wherein said mounting means includes
   a pair of mounting blocks, each having a fixed end which is fixed to said frame and a free end which is arranged in spaced relationship to said frame,
   means for urging the pivot end of said lever to engage the free ends of said respective mounting blocks, and
   means for controllably flexing the ends of said respective mounting blocks relative to said frame, thereby permitting a fine adjustment of the location of the pivot axis of said lever relative to said frame and, in turn, the position of said transducer head relative to the center of a track on the magnetic tape.

14. Apparatus for positioning a transducer head relative to a series of parallel tracks on a recording medium, said apparatus comprising:
   a frame having means for guiding the recording medium along a predetermined path;
   a cam mounted for movement on said frame, said cam having a plurality of planar steps formed therein, each of said steps corresponding to a separate track on the recording medium;
   a lever having a pivot end, a mid-portion and a remote end;
   means for mounting said lever to said frame for pivotal movement with respect thereto, with the remote end of said lever bearing on the steps of said cam; and
   means coupled to the mid-portion of said lever for supporting said transducer head, said support means including
   a platform to carry said transducer head,
   means for urging said platform to engage the mid-portion of said lever,
   a ball bearing interposed between said platform and said lever, and
   alignment means for maintaining a fixed angular orientation of said platform relative to said frame, whereby movement of said cam effects a stepping movement of the remote end of said lever and, likewise, a translational stepping movement, of lesser magnitude, of said platform, to position said transducer head relative to the tracks on the recording medium.

15. Apparatus for positioning a transducer head relative to the center of a track on a recording medium, said apparatus comprising:
   a frame having means for guiding the recording medium along a predetermined path; and
   means for supporting said transducer head, said support means including
   a mounting block having a fixed end that is fixed to said frame and a free end that is in spaced relationship to said frame,
   a ball bearing located on the free end of said mounting block,
   means for coupling said transducer head to said ball bearing, and
   means for controllably flexing a portion of said mounting block with respect to said frame to thereby position said transducer head relative to the center of the track on the recording medium.

16. Apparatus for positioning a transducer head in relation to the centers of a plurality of parallel tracks on a recording medium, said apparatus comprising:
   a frame having a means for guiding the recording medium along a predetermined path;
   a cam mounted for movement on said frame;
   a lever having a pivot end and a remote end;
   means for pivotally mounting the pivot end of said lever to said frame, with the remote end of the lever bearing on the cam; and
   means coupled to mid-portion of said lever for supporting said transducer head, whereby movement of said cam relative to said frame effects movement, of corresponding but lesser magnitude, of said transducer head, to thereby position said transducer head relative to a selected track on the recording medium,
   said mounting means including
   a mounting block having a fixed end that is fixed to said frame and a free end that is in spaced relationship to said frame and that supports the pivot end of said lever,
   a ball bearing interposed between the free end of said mounting block and the pivot end of said lever,
   means for urging the pivot end of said lever and the free end of said mounting block to engage said ball bearing, and
   means for controllably flexing a portion of said mounting block with respect to said frame to thereby position said transducer head relative to the centers of the tracks on the recording medium.

* * * * *

UNITED STATES PATENT AND TRADEMARK OFFICE
CERTIFICATE OF CORRECTION

PATENT NO. : 4,275,427
DATED      : June 23, 1981
INVENTOR(S) : James Bjordahl

It is certified that error appears in the above—identified patent and that said Letters Patent is hereby corrected as shown below:

IN THE CLAIMS

In Claim 13, line 18, after "the" and before "ends", --free-- should be inserted.

Signed and Sealed this

Seventeenth Day of August 1982

[SEAL]

*Attest:*

GERALD J. MOSSINGHOFF

*Attesting Officer*   *Commissioner of Patents and Trademarks*